United States Patent [19]

Völkl et al.

[11] Patent Number: 4,730,663

[45] Date of Patent: Mar. 15, 1988

[54] PASSIVE COOLING ARRANGEMENT

[75] Inventors: Heinrich Völkl, Schliersee; Heinrich Sandner, Gröbenzoll; Bernd Heits, Hanover, all of Fed. Rep. of Germany

[73] Assignee: Deutsche Gesellschaft für Wiederaufarbeitung von Kernbrennstoffen mbH, Hanover, Fed. Rep. of Germany

[21] Appl. No.: 10,439

[22] Filed: Feb. 3, 1987

[30] Foreign Application Priority Data

Feb. 5, 1986 [DE] Fed. Rep. of Germany ....... 3603566

[51] Int. Cl.⁴ ..................... F28B 1/06; F28D 15/02; G05D 23/00
[52] U.S. Cl. .................. 165/32; 165/104.14; 165/104.19; 165/110
[58] Field of Search ................ 165/32, 96, 104.14, 165/104.19, 110

[56] References Cited

U.S. PATENT DOCUMENTS 3,749,158  7/1923  Szabo et al. ..................... 165/96
4,033,406  7/1977  Basiulis ........................... 165/32

FOREIGN PATENT DOCUMENTS 385294 12/1932  United Kingdom ............ 165/96

Primary Examiner—Albert W. Davis, Jr.
Attorney, Agent, or Firm—Walter Ottesen

[57] ABSTRACT

A passive cooling arrangement includes a primary hot-cooling circuit and a secondary convection cooling circuit. A condenser is arranged in the lower region of the convection cooling circuit. This condenser is provided for the medium of the hot-cooling circuit which is to be cooled down. A heat exchanger is arranged in the upper region of the secondary convection cooling circuit for cooling the coolant down by means of the ambient air. In order to prevent the condenser from freezing up in periods of frost which are of prolonged duration, the secondary convection cooling circuit includes means which, in the event of a reduction in the volume of the coolant due to falling temperature, effects a throttling or interruption of the flow of coolant through the heat exchanger. In this way the condenser cannot be cooled down any further.

4 Claims, 1 Drawing Figure

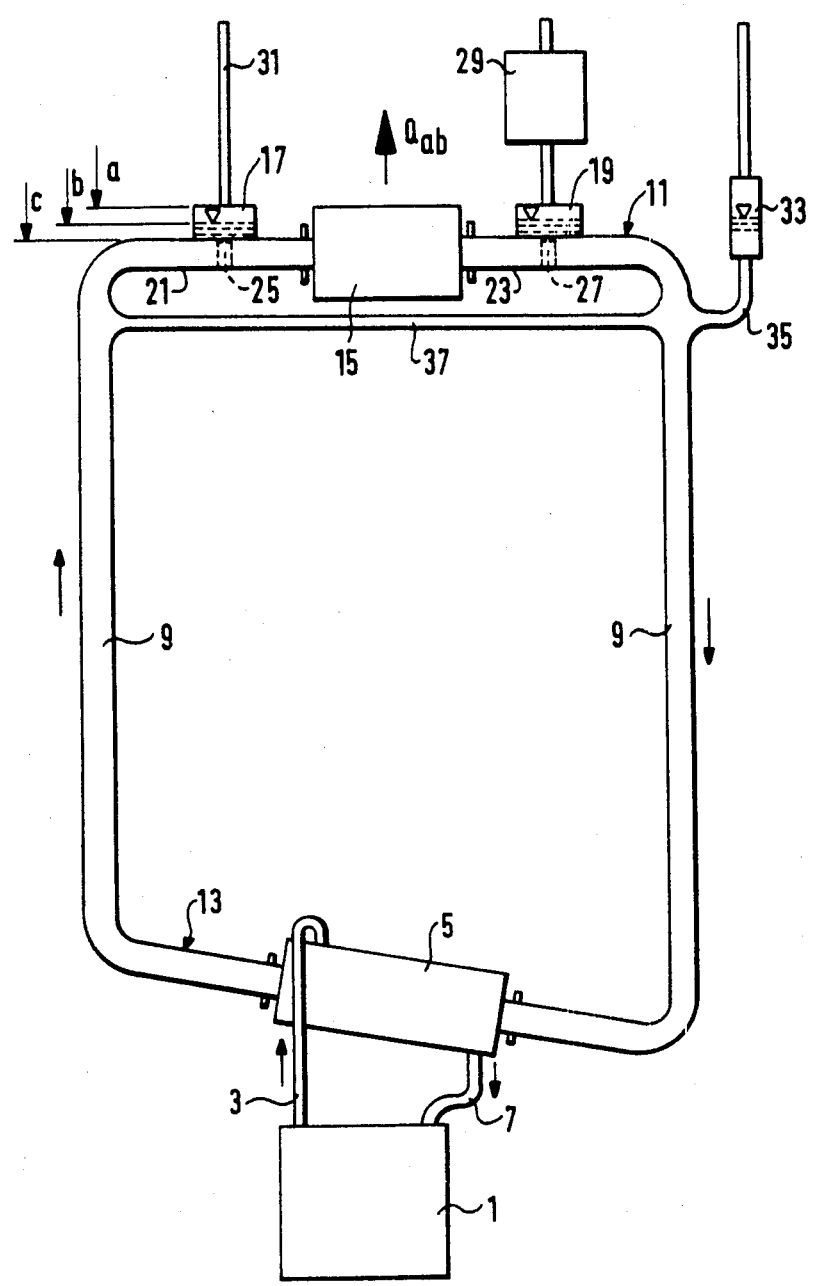

PASSIVE COOLING ARRANGEMENT

FIELD OF THE INVENTION

The invention relates to a passive cooling arrangement which includes a convection cooling circuit wherein the cooling action can be limited.

BACKGROUND OF THE INVENTION

When removing heat from heat sources, for example, when cooling containers with a self-heating content such as concentrated highly radioactive liquids, a convection cooling circuit is often used. The flow of coolant is produced by convection. This affords the advantage that no outside energy is necessary for the purposes of cooling or carrying heat away, and the cooling operation starts up automatically when required.

Such a system operates passively, that is, the system does not need either a drive means or a control means. It is therefore particularly suitable for use in nuclear installations to which access is difficult because of radioactivity.

It has been suggested that the secondary convection cooling circuit be provided with a condenser and an air cooler. In the primary cooling circuit, self-heating of the radioactive concentrate results in the formation of vapor. The vapor is passed into the condenser and cooled down. The condensate is returned to the containers.

In order to ensure a flow of coolant even at low temperatures, frost-protected coolants are used. A coolant such as hexamolar $HNO_3$ is used which is frost-proof down to $-40°$ Celsius.

The coolant flows through the air cooler and, giving off heat to the outside air, approximately assumes the temperature of the latter. The condenser is therefore supplied with the coolant at the assumed temperature so that the possibility should be considered that the condenser can freeze up in the event of periods of frost which go on for a prolonged period of time. This would prevent the removal of heat via the condenser.

SUMMARY OF THE INVENTION

It is an object of the invention to provide an arrangement wherein the cooling action of a convection cooling circuit for a passive cooling system is limited. It is a further object of the invention to provide such an arrangement wherein a freezing tight of the condenser of the cooling arrangement is prevented and for which the use of any outside energy is not required.

The passive cooling arrangement of the invention includes a secondary convection cooling circuit for conducting a coolant which reduces in volume in response to a drop in temperature, the secondary convection cooling circuit having an upper portion and a lower portion; a primary hot-cooling circuit including a condenser for receiving the medium to be cooled, the condenser being connected into the lower portion to facilitate a transfer of heat from the medium to the coolant; heat exchanger means mounted in the upper portion for transferring heat received by the coolant to the ambient to thereby cool the coolant to approximately the temperature of the ambient; and, throttling means for throttling or interrupting the flow of the coolant through the secondary convection cooling circuit in response to a reduction in the volume of the coolant.

The arrangement of the invention utilizes the reduction in volume of the coolant due to the cooling action to throttle or interrupt the flow. By an appropriate configuration, it is possible to interrupt the secondary convection cooling circuit at a specified temperature. The condenser can then not be cooled down any further and it thus remains at the temperature of the shielded cell in which the container store is mounted.

The upper portion can include an inlet conduit and an outlet conduit for conducting the coolant to and away from the heat exchanger means. In an advantageous embodiment of the invention, the throttling means includes two chambers arranged in respective ones of the inlet and outlet conduits to define enlarged cross sections thereof and the inlet and outlet conduits are at the highest elevation of the secondary convection cooling circuit. Overflow weirs are mounted in the chambers, respectively, for reducing the flow of coolant through the secondary convection cooling circuit as the volume thereof becomes less with a decreasing temperature.

The arrangement of two overflow weirs at the highest location on the secondary convection cooling circuit ensures complete separation of the air cooler from the stationary coolant.

The invention makes certain that the function of passive hot cooling continues even in the event of frost situations of prolonged duration. Also, no auxiliary energy for regulating devices is required and no maintenance and handling operations are involved.

BRIEF DESCRIPTION OF THE DRAWING

The invention will now be described with reference to the single figure of the drawing which shows a schematic representation of the arrangement according to the invention.

DESCRIPTION OF THE PREFERRED EMBODIMENTS OF THE INVENTION

A storage container 1 containing concentrated highly radioactive liquid waste (HAWC) is connected by means of a conduit 3 to the highest point of an inclined pipe-coil condenser 5 and by means of a return conduit 7 to the lower discharge end of the condenser 5. The container 1, the conduits 3 and 7 and the vapor space within the condenser 5 conjointly define the primary cooling circuit.

The secondary cooling circuit includes perpendicular conduits 9, the upper ends of which are connected together by a horizontal conduit portion 11 and whose lower ends are connected together by an inclined conduit portion 13 containing the above-mentioned condenser 5. Hexamolar $HNO_3$ is used as a coolant in the secondary cooling circuit. Arranged in the upper conduit portion 11 is an air cooler 15 for the discharge of heat of the coolant. Upstream and downstream of the air cooler 15, the conduit portion 11 has chambers 17 and 19 whereat the cross section of the conduit portion 11 is increased. Overflow weirs 25 and 27 are arranged in the respective chambers 17 and 19 on the base of the respective horizontal conduit sections 21 and 23.

The chamber 19 is arranged downstream of the air cooler 15 in the flow direction and is connected to a compensating vessel 29 while the other chamber 17 has a vent conduit 31 at its upper point. The compensating vessel 29 can accommodate major expansion of the coolant. The secondary circuit is conjointly defined by the conduits 9, the conduit portions 11 and 13, the condenser 5 and the air cooler 15. At its upper right-hand side, the secondary cooling circuit is provided with a filling-condition indicator vessel 33 which is connected to the circuit by means of a connecting line 35. A smaller bypass conduit 37 is disposed beneath the upper conduit portion 11. The bypass conduit 37 extends in parallel to the upper conduit 37 and bypasses the chambers 17 and 19 and the air cooler 15.

The operation of the above-described arrangement will now be described.

In normal operation of the cooling arrangement described above, the filling condition of the coolant is so set that the chambers 17 and 19 with the respective overflow weirs 25 and 27 are completely filled (see the level indicator arrow a). The maximum mass flow of the coolant can flow through the air cooler 15 which represents a heat exchanger.

If the temperature of the circulating coolant falls, the volume of coolant and thus the filling-level drop (level indicator arrow b). The mass flow through the air cooler 15 is throttled by the now smaller flow cross section in the chambers 17 and 19 at the overflow weirs 25 and 27.

If the temperature of the coolant drops further and if it falls below a mean circuit temperature which can be adjusted by means of the amount of coolant filling the arrangement, the filling level falls below the top edge of the overflow weirs 25 and 27 (level indicator arrow c). This can be possible in a long period of frost because of the cooling action of the heat exchanger 15. As a result, the coolant reduces in volume which is the reason why the filling level drops below the top edge of the overflow weirs. The coolant can no longer flow through the heat exchanger 15 and thus it is no longer possible for the coolant to be cooled down further by giving off heat to the ambient air.

It is only through the bypass conduit 37 which is of smaller diameter that there is a residual circulation which serves to regularize temperature distribution in the coolant circuit. The minimum circulation can take place through the bypass conduit 37 with the chambers 17 and 19 and the air cooler 15 being bypassed. This ensures that the increase in volume of a warm portion of the coolant is not compensated by the reduction in volume of a colder portion. The smaller diameter ensures that, under full-load conditions, only a small portion of the coolant flows through the bypass conduit 37.

If the coolant temperature rises again above the adjusted mean circuit temperature because of the decay heat generated in the container 1, the coolant expands. As a result, the chambers 17 and 19 with the overflow weirs 25 and 27 are filled and the flow of coolant can again pass through the air cooler 15.

The coolant which is usually employed is hexamolar nitric acid which remains liquid to −40° Celsius.

The change in volume with a given temperature distribution depends on the overall amount of coolant. The resulting change in filling level may be adjusted by varying the cross section of the chambers 17 and 19. By virtue of the dimensions of the chambers 17 and 19, it is possible to provide that the dependency of sensitivity on mean circuit temperature is adapted to the particular requirements of a passive system of this kind.

It is understood that the foregoing description is that of the preferred embodiments of the invention and that various changes and modifications may be made thereto without departing from the spirit and scope of the invention as defined in the appended claims.

What is claimed is:

1. A passive cooling arrangement comprising:
a secondary convection cooling circuit for conducting a coolant which reduces in volume in response to a drop in temperature, said secondary convection cooling circuit having an upper portion and a lower portion;
a primary hot-cooling circuit including a condenser for receiving the medium to be cooled, said condenser being connected into said lower portion to facilitate a transfer of heat from said medium to said coolant;
heat exchanger means mounted in said upper portion for transferring heat received by the coolant to the ambient to thereby cool the coolant to approximately the temperature of the ambient; and,
throttling means for throttling or interrupting the flow of the coolant through said secondary convection cooling circuit in response to a reduction in the volume of the coolant.

2. The cooling arrangement of claim 1, said upper portion including an inlet conduit and an outlet conduit for conducting the coolant to and away from said heat exchanger means, said throttling means including: two chambers arranged in respective ones of said inlet and outlet conduits to define enlarged cross sections thereof and said inlet and outlet conduits being at the highest elevation of said secondary convection cooling circuit; and, overflow weirs mounted in said chambers, respectively, for reducing the flow of coolant through said secondary convection cooling circuit as said volume thereof becomes less with a decreasing temperature.

3. The cooling arrangement of claim 2, comprising a fill-level indicating vessel connected to said upper portion for monitoring the level of said coolant in said secondary convection cooling circuit.

4. The cooling arrangement of claim 2, comprising a bypass conduit bridging said upper portion and having a diameter less than the diameter of said inlet and outlet conduits.

* * * * *